US012755910B2

(12) United States Patent
Wang

(10) Patent No.: US 12,755,910 B2
(45) Date of Patent: Oct. 6, 2026

(54) BALANCE BAR CONNECTING STRUCTURE FOR KEY AND SATELLITE SHAFT STRUCTURE FOR SAME

(71) Applicant: VOYETRA TURTLE BEACH, INC., San Diego, CA (US)

(72) Inventor: Wei Chuan Wang, New Taipei City (TW)

(73) Assignee: Voyetra Turtle Beach, Inc., San Diego, CA (US)

(*) Notice: Subject to any disclaimer, the term of this patent is extended or adjusted under 35 U.S.C. 154(b) by 216 days.

(21) Appl. No.: 17/761,534

(22) PCT Filed: Sep. 17, 2020

(86) PCT No.: PCT/IB2020/058664
§ 371 (c)(1),
(2) Date: Oct. 14, 2022

(87) PCT Pub. No.: WO2021/053569
PCT Pub. Date: Mar. 25, 2021

(65) Prior Publication Data

US 2023/0050678 A1 Feb. 16, 2023

(30) Foreign Application Priority Data

Sep. 17, 2019 (TW) ................................ 108212293
Sep. 26, 2019 (CN) ........................ 201921614623.2

(51) Int. Cl.
*H01H 13/20* (2006.01)
*H01H 13/14* (2006.01)

(52) U.S. Cl.
CPC ............ *H01H 13/20* (2013.01); *H01H 13/14* (2013.01)

(58) Field of Classification Search
CPC .. H01H 13/20; H01H 13/14; H01H 2217/004; H01H 2221/026;
(Continued)

(56) References Cited

U.S. PATENT DOCUMENTS 11,521,809 B2 * 12/2022 Wu ........................ H01H 3/122
11,755,125 B1 * 9/2023 Norbauer .............. G06F 3/0224
345/168
(Continued)

FOREIGN PATENT DOCUMENTS

CN 203607300 U 5/2014
CN 105513868 A 4/2016
(Continued)

*Primary Examiner* — Lheiren Mae A Caroc
(74) *Attorney, Agent, or Firm* — Sheppard Mullin Richter & Hampton LLP

(57) ABSTRACT

A balance bar connecting structure and a satellite shaft structure for the same, wherein the balance bar connecting structure comprises two satellite shaft modules and a balance bar member; the two satellite shaft modules each include a base body and a satellite shaft member; the balance bar member has a connecting bar section, two linkage sections, and two sliding sections respectively bent relative to each other from the two linkage sections; and the connecting bar section is pivotally connected between the two base bodies, and the two linkage sections face the two satellite shaft members, respectively, so that the two sliding sections are cooperatively connected to the two satellite shaft members; wherein the two satellite shaft members are each provided with a sliding groove so as to allow the two sliding sections to slide transversely in the sliding grooves, respectively.

12 Claims, 8 Drawing Sheets

(58) Field of Classification Search
CPC .. H01H 2221/058; H01H 3/122; H01H 13/84; H01H 3/125; H01H 13/7065; H01H 13/705; H01H 13/70
See application file for complete search history.

(56) References Cited

U.S. PATENT DOCUMENTS

| | | | |
|---|---|---|---|
| 2011/0102323 | A1 | 5/2011 | Chen |
| 2017/0194109 | A1 | 7/2017 | Ren |
| 2018/0197699 | A1 | 7/2018 | Shen |

FOREIGN PATENT DOCUMENTS

| | | | |
|---|---|---|---|
| CN | 205452119 | U | 8/2016 |
| CN | 205723278 | U | 11/2016 |
| CN | 106783319 | A | 5/2017 |
| CN | 208570427 | U | 3/2019 |
| CN | 210805578 | U | 6/2020 |
| TW | M592114 | U | 3/2020 |

* cited by examiner

BALANCE BAR CONNECTING STRUCTURE FOR KEY AND SATELLITE SHAFT STRUCTURE FOR SAME

REFERENCE TO RELATED APPLICATIONS

The present application is a U.S. national phase of PCT International Application No. PCT/IB2020/058664, filed on Sep. 17, 2020 and claims priority to Chinese Patent Application No. 201921614623.2, filed Sep. 26, 2019 and Taiwan Patent Application No. 108212293, filed on Sep. 17, 2019, which are incorporated herein by reference in their entireties.

TECHNICAL FIELD

The present utility model relates to a key, and in particular to a balance bar connecting structure for a key and a satellite shaft structure for the same.

BACKGROUND ART

At present, for example, keys applied to a keyboard are often designed with consideration for the arrangement or use of the keys, and a balance bar and its connecting structure are added under so-called multiple keys such as space key (Space), input key (Enter), shift key (Shift) or Caps Lock key (Caps Lock), so that when the key cap of the key is pressed by a finger of a human hand, the balance of the entire key cap can be maintained in action. In this way, it can be prevented that the correctness of the user's input and the feeling of tapping are affected due to factors such as blind typing, failure to accurately hit the center of the key cap, or insufficient distance between the fingers of the human hand.

However, although various design solutions have been proposed in the prior art to address the above-mentioned problems, there are still deficiencies and shortcomings in the balance of keys such as multiple keys applied to mechanical keyboards.

In view of this, in order to improve and solve the above-mentioned shortcomings, the creator has devoted himself to research and, in conjunction with the application of academic theories, finally proposed the present utility model with reasonable design and effectively improving the above-mentioned shortcomings.

SUMMARY OF THE UTILITY MODEL

A main objective of the present utility model is to provide a balance bar connecting structure for a key and a satellite shaft structure for the same to solve the problems in the prior art.

In order to achieve the above objective, the present utility model provides a balance bar connecting structure for a key, comprising two satellite shaft modules and a balance bar member, wherein the two satellite shaft modules each include a base body and a satellite shaft member movably arranged on the base body; the balance bar member has a connecting bar section, two linkage sections respectively bent in the same direction from both ends of the connecting bar section, and two sliding sections respectively bent relative to each other from the two linkage sections; and the connecting bar section is pivotally connected between the two base bodies, and the two linkage sections face the two satellite shaft members, respectively, so that the two sliding sections are cooperatively connected to the two satellite shaft members; and wherein the two satellite shaft members are each provided with a sliding groove so as to allow the two sliding sections to slide transversely in the sliding grooves, respectively.

In order to achieve the above objective, the present utility model further provides a satellite shaft structure for a key, that is, the above-mentioned satellite shaft member. The satellite shaft structure comprises a linkage portion and an engaging portion arranged on the linkage portion and extending upward, wherein the linkage portion is provided with a sliding groove, and the sliding groove is in an open state on at least one side on the linkage portion, and is formed to extend in a direction away from the at least one side in the open state.

Thus, the correctness and the feeling of tapping when a user presses a key to input are improved.

DESCRIPTION OF REFERENCE SIGNS IN THE FIGURES

1 satellite shaft module; 10 base body; 100 sleeve portion; **100*a* movable opening; 100*b* elastic fastener; 101 pivot portion; 101*an* elastic fastener; 102 action space; 11 satellite shaft member; 110 linkage portion; 111 engaging portion; 112 sliding groove; 112*a* groove bottom; 112*b* groove wall; 112*c* groove opening; 2 balance bar member; 20 connecting bar section; 21 linkage section; 22 sliding section; 3 key cap; 30 push switch; 31 circuit board; 32** bottom plate.

DETAILED DESCRIPTION OF THE PREFERRED EMBODIMENTS

In order to further reveal the features and technical content of the present utility model, reference is made to the following detailed description of the present utility model and the drawings. However, the drawings are only for reference and description, and are not used to limit the present utility model.

Figure 1:
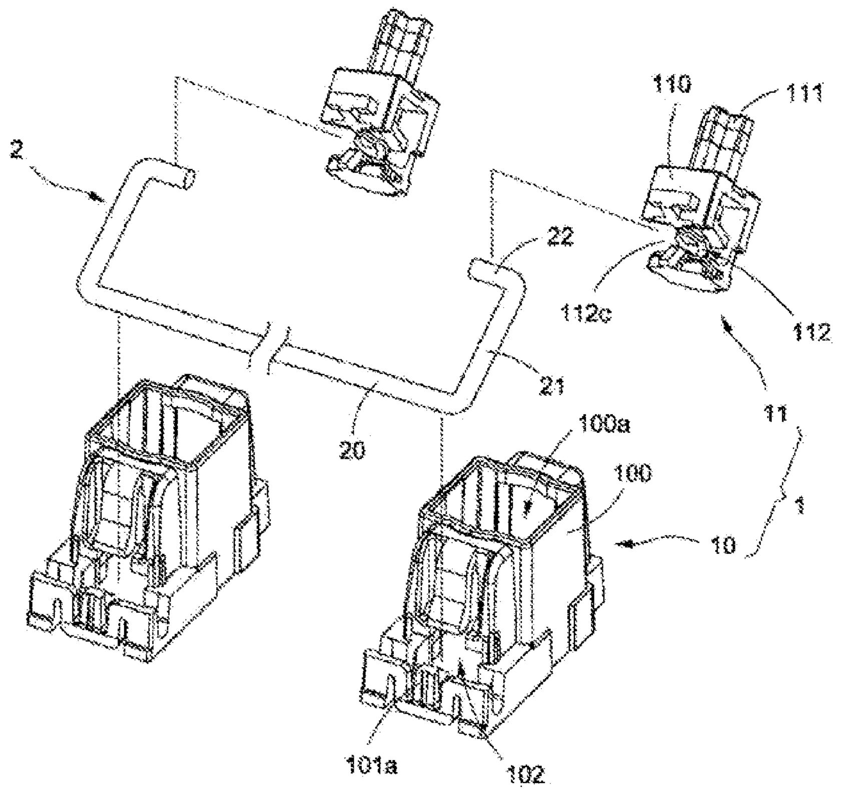
FIG. 1 is a schematic three-dimensional exploded view of the present utility model.
Figure 2:
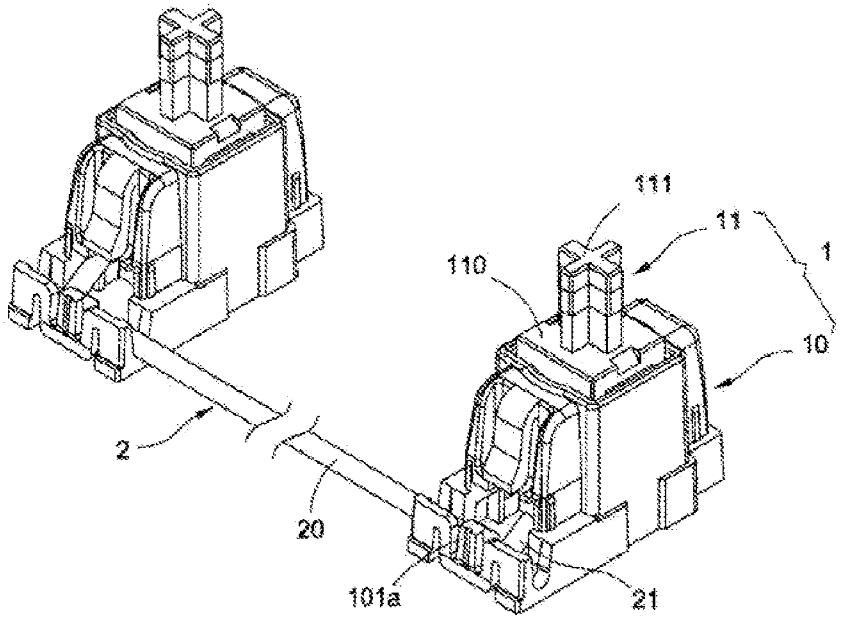
FIG. 2 is a schematic three-dimensional combined view of a lower shell of the present utility model.
Figure 3:
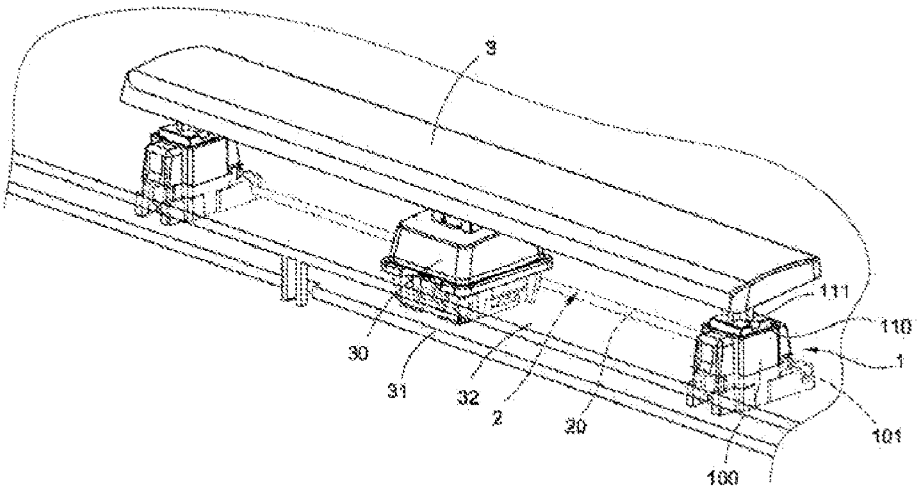
FIG. 3 is a schematic view of installed keys of the present utility model in a use state.

Reference is made to FIGS. 1, 2 and 3, which are a schematic three-dimensional exploded view, a schematic three-dimensional combined view, and a schematic view of installed keys in a use state of the present utility model, respectively. The present utility model provides a balance bar connecting structure for a key and a satellite shaft structure for the same. The balance bar connecting structure comprises two satellite shaft modules 1 and a balance bar member 2 arranged between the two satellite shaft modules 1.

The two satellite shaft modules 1 may both be composed of plastic members and are arranged at any distance from each other for supporting the above balance bar member 2. The two satellite shaft modules 1 each include a base body 10 and a satellite shaft member 11 movably arranged on the base body 10. The base body 10 has a sleeve portion 100 and a pivot portion 101 arranged on a side of the sleeve portion 100, and the sleeve portion 100 is higher than the pivot portion 101 and has a movable opening 100*a*. The movable opening 100*a* is connected in the sleeve portion 100, so that the sleeve portion 100 is hollow, and an action space 102 connected from the pivot portion 101 into the sleeve portion 100 is provided in the sleeve portion 100.

The satellite shaft member 11 is a satellite shaft structure for a key in the present utility model. It has a linkage portion 110 movably arranged in the above sleeve portion 100 of the base body 10 and an engaging portion 111 protruding out of the sleeve portion 100 through the movable opening 100*a*. The engaging portion 111 is arranged on the linkage portion 110 and extends upward, that is, it is used to be clamped on a bottom surface of a key cap 3 (that is, as shown in FIG. 3), so as to allow the key cap 3 to be arranged on a circuit board 31 such as a keyboard through a push switch 30, so that when pressed, the push switch 30 transmits a pressed signal, instruction or the like to the circuit board 31, and thereby it is carried therein by a bottom plate 32 of the keyboard. The linkage portion 110 is provided with a sliding groove 112 opposite to the pivot portion 101. The sliding groove 112 is in an open state on at least one side on the linkage portion 110, namely, a side corresponding to the pivot portion 101, and the sliding groove 112 is formed to extend in a direction away from the pivot portion 101 or in a direction away from the at least one side in the open state. One of the embodiments illustrated in the present utility model is that three sides are in an open state, and the other two sides are two sides in a vertical direction opposite to the pivot portion 101.

The balance bar member 2 may be formed by bending a metal bar member, and has a connecting bar section 20, two linkage sections 21 respectively bent in the same direction from both ends of the connecting bar section 20, and two sliding sections 22 respectively bent relative to each other from the two linkage sections 21. The connecting bar section 20 has a certain length and can spanned and pivotally connected to the pivot portions 101 of the base bodies 10 of the two satellite shaft modules 1, and an elastic fastener 101*a* may be provided on the pivot portion 101 to be fastened against the connecting bar section 20 from the outside of the pivot portion 101 inward. Further, its length can be used as the distance between the two satellite shaft modules 1, and the two linkage sections 21 each extend from the action space 102 of the base body 10 of the respective satellite shaft module 1 into the respective sleeve portion 100, so that the two sliding sections 22 can be cooperatively connected to the sliding grooves 112 of the satellite shaft members 11 of the satellite shaft modules 1, respectively, that is, the two sliding sections 22 are inserted into the two sliding grooves 112 in a transverse direction to slide, respectively. In addition, since the balance bar member 2 is connected with its two sliding sections 22 sliding in the sliding grooves 112 of the satellite shaft members 11, respectively, it is convenient to align and assemble. Then, the connecting bar section 20 of the balance bar member 2 is pivotally fastened between the pivot portions 101 of the two base bodies 10 and is fastened by the elastic fastener 101*a*, which is convenient for assembly. At the same time, it can be seen from FIG. 3 that the balance bar member 2 is hidden in the bottom plate 32 of the keyboard after the assembly is completed, so it can also be prevented from being exposed.

Figure 4:
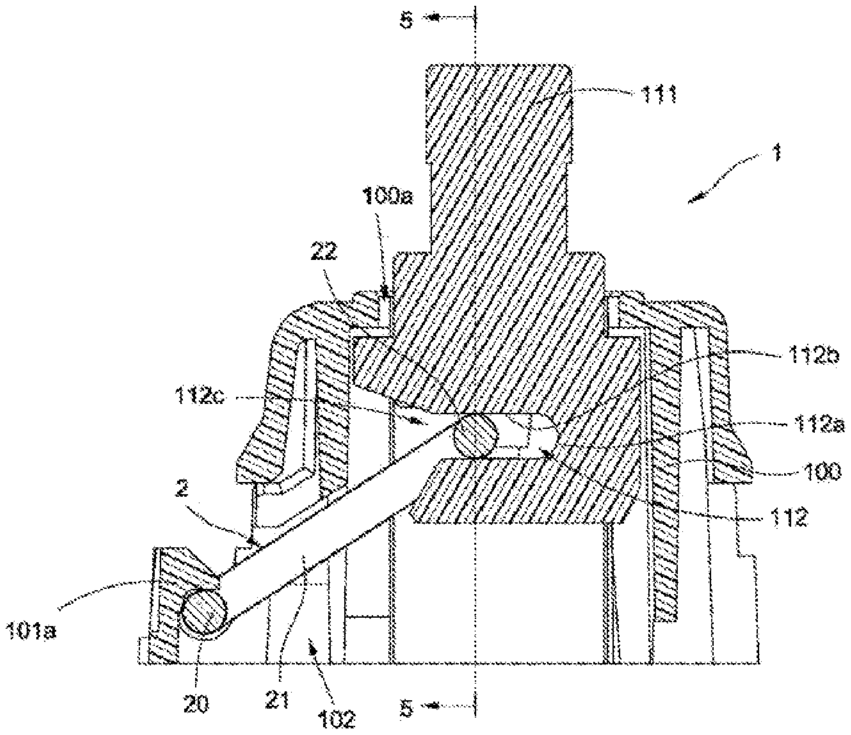
FIG. 4 is a schematic cross-sectional view of the present utility model before being pressed.
Figure 5:
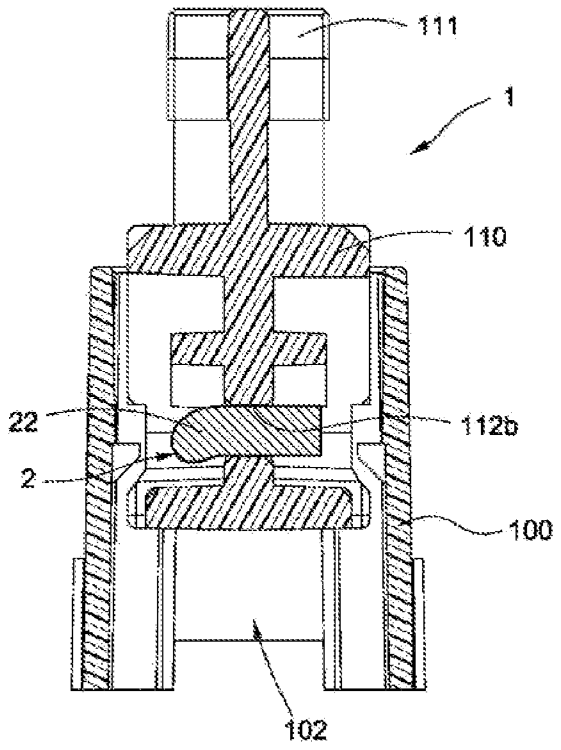
FIG. 5 is a cross-sectional view taken along line 5-5 in FIG. 4.

Continuing from the above, reference is made to FIGS. 4 and 5 together. Since the key cap 3 is driven by the above push switch 30, and it is pushed up by the push switch 30 when it is not pressed, the satellite shaft members 11 of the two satellite shaft modules 1 are also in an unpressed state. At this time, the two sliding sections 22 of the above-balance bar member 2 are only engaged in the two sliding grooves 112 with an open state on one side, respectively. In more detail, each sliding groove 112 has a groove bottom 112*a* away from the pivot portion 101, two opposing groove walls 112*b* extending from the groove bottom 112*a* toward the pivot portion 101, and a groove opening 112*c* formed between the two opposing groove walls 112*b* and adjacent to the pivot portion 101. The groove opening 112*c* serves as the open state of the one side described previously. The sliding section 22 is transversely engaged in the sliding groove 112 by the groove opening 112*c*, and still maintains a certain distance from the groove bottom 112*a* of the sliding groove 112.

Figure 6:
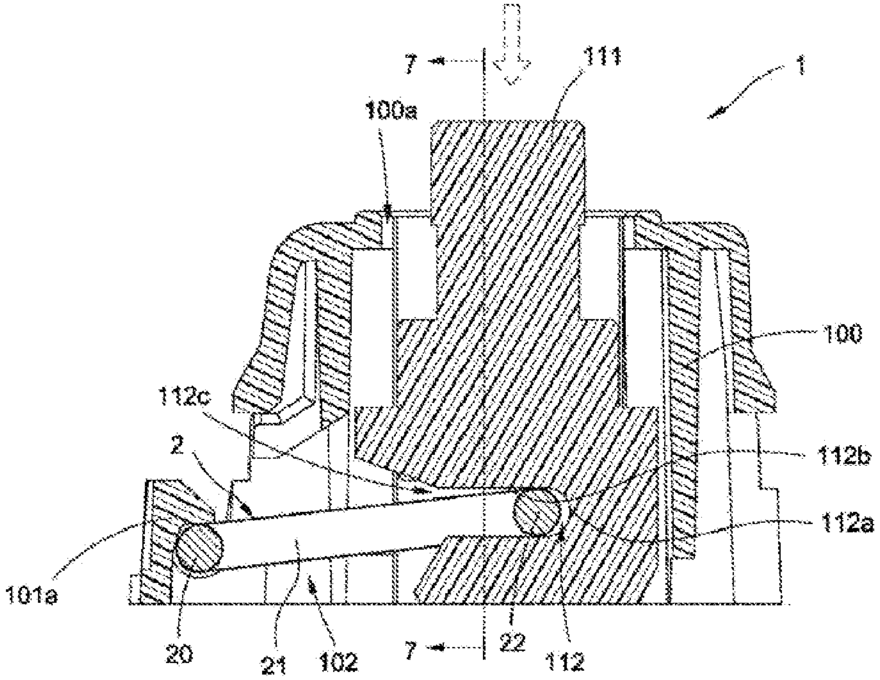
FIG. 6 is a schematic cross-sectional view of the present utility model after being pressed.
Figure 7:
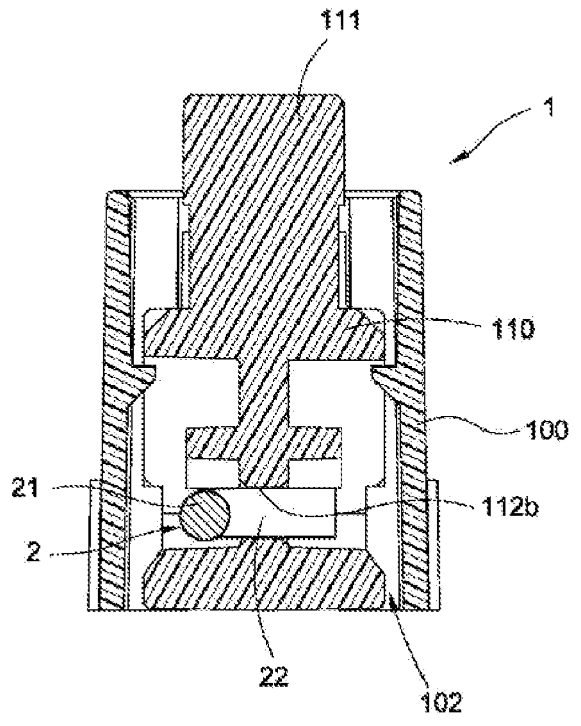
FIG. 7 is a cross-sectional view taken along line 7-7 in FIG. 6.

Reference is made to FIGS. 6 and 7 together. If the key cap 3 is tapped by a human hand and the push switch 30 is pressed, the key cap 3 will drive any satellite shaft member 11 to move downward, so that the driven satellite shaft member 11 links the sliding section 22 of the balance bar member 2 to slide in the sliding groove 112 (that is, sliding to the distance maintained between the sliding section 22 and the groove bottom 112*a*). Moreover, since the force received by pressing can be transmitted to the connecting bar section 20 pivotally connected to the base body 10 through the linkage section 21 of the balance bar member 2, the actions of the two satellite shaft modules 1 when they are pressed to act can be balanced by the balance bar member 2, thereby achieving the purpose that the key cap 3 is acted smoothly and the press switch 30 is pressed correctly to input signals and instructions.

Figure 8:
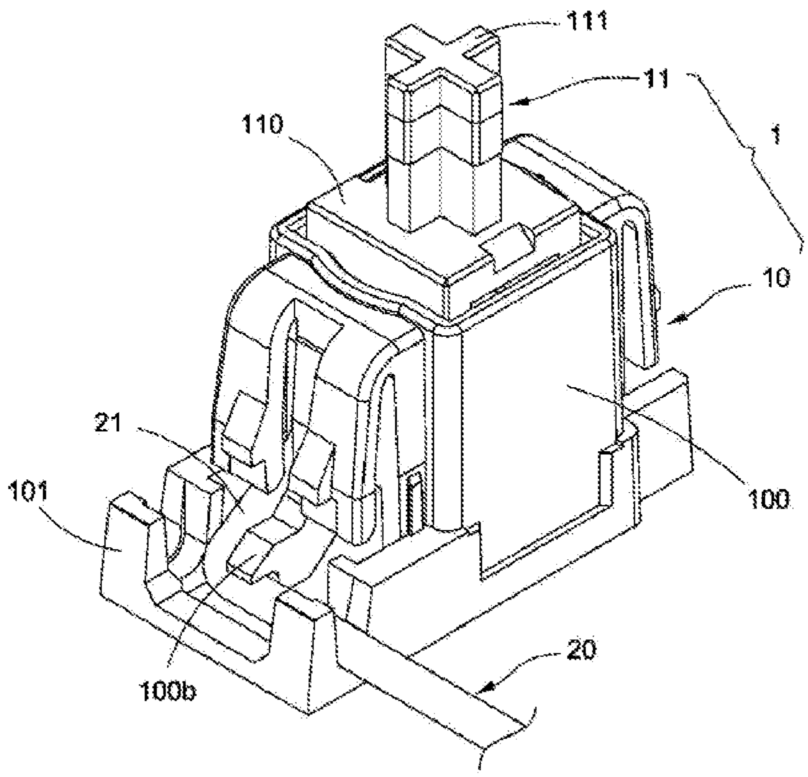
FIG. 8 is a schematic three-dimensional combined view of another embodiment of the present utility model.
Figure 9:
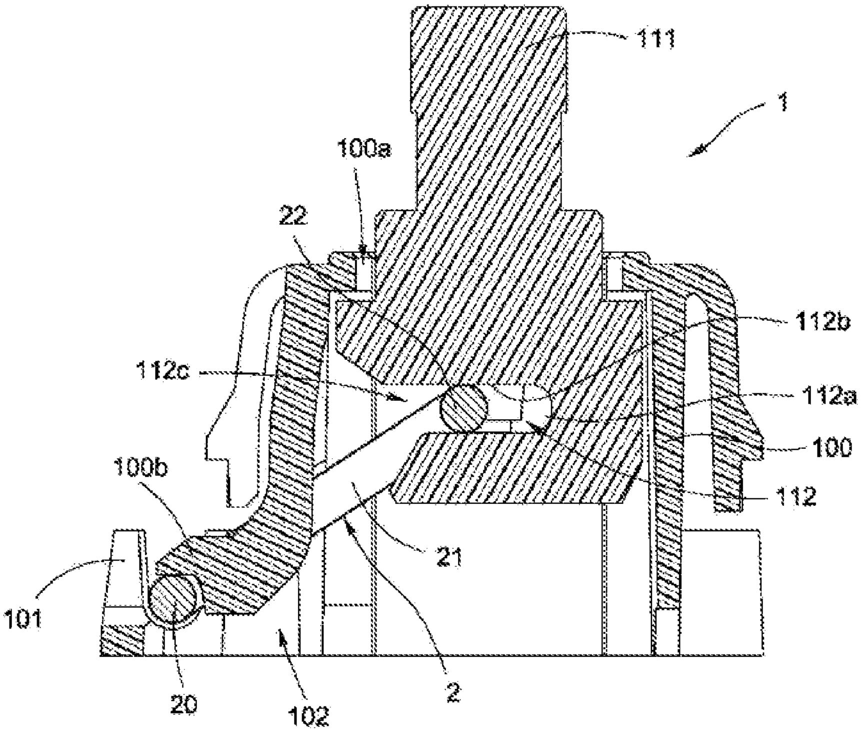
FIG. 9 is a schematic cross-sectional view of another embodiment of the present utility model.

Furthermore, as shown in FIGS. 8 and 9, in other specific embodiments of the present utility model, on the base bodies 10 of the above two satellite shaft modules 1, an elastic fastener 100*b* extending downward from a side of its sleeve portion 100 facing the pivot portion 101 is formed, so that while the connecting bar section 20 of the balance bar member 2 is pivotally connected to the pivot portion 101, it can also be further fastened against the connecting bar section 20 from top to bottom by the spring buckle 100*b*.

Therefore, by means of combining the above-mentioned structures, the balance bar connecting structure for the key and the satellite shaft structure for the same of the present utility model can be obtained.

The preferred and feasible embodiments of the present utility model are only as described above, and do not limit the patent scope of the present utility model. Therefore, all equivalent structural changes made by using the description and drawings of the present utility model are all included in the scope of the present utility model, and are thereby stated.

The invention claimed is:

1. A balance bar connecting structure for a key, comprising:
   two satellite shaft modules, each of which includes a base body and a satellite shaft member movably arranged on the base body; and
   a balance bar member having a connecting bar section, two linkage sections respectively bent in a same direction from both ends of the connecting bar section, and two sliding sections respectively bent relative to each other from the two linkage sections, wherein the connecting bar section comprises a single straight bar pivotally connected between the two base bodies such that a first end of the single straight bar is connected at a center of one of the satellite shaft modules and a second end of the single straight bar is connected at a center of another satellite shaft module, and the two linkage sections face the two satellite shaft members, respectively, so that the two sliding sections are cooperatively connected to the two satellite shaft members, wherein each linkage section extends through a center of a base body of one of the two satellite shaft modules and is at least partially contained within the base body;

wherein the two satellite shaft members are each provided with a sliding groove so as to allow the two sliding sections to slide transversely in the sliding grooves, respectively.

2. The balance bar connecting structure for the key as claimed in claim 1, characterized in that the base bodies of the two satellite shaft modules each have a hollow inner sleeve portion and a pivot portion arranged on one side of the sleeve portion, and the connecting bar section of the balance bar member is pivotally connected between the pivot portions of the two base bodies.

3. The balance bar connecting structure for the key as claimed in claim 2, characterized in that the base body is formed with an elastic fastener extending downward from a side of the sleeve portion facing the pivot portion, and the elastic fastener is fastened against the connecting bar section of the balance bar member from top to bottom.

4. The balance bar connecting structure for the key as claimed in claim 2, characterized in that the pivot portion is provided with an elastic fastener to be fastened against the connecting bar section of the balance bar member from an outer side of the pivot portion inward.

5. The balance bar connecting structure for the key as claimed in claim 2, characterized in that the sleeve portion is higher than the pivot portion and has a movable opening, and the satellite shaft member is movably arranged on the base body and protrudes out of the movable opening.

6. The balance bar connecting structure for the key as claimed in claim 5, characterized in that the satellite shaft member has a linkage portion movably arranged in the sleeve portion and an engaging portion protruding out of the sleeve portion through the movable opening, and the sliding groove is formed on the linkage portion.

7. The balance bar connecting structure for the key as claimed in claim 6, further comprising a key cap, wherein the engaging portions of the two satellite shaft modules are clamped on a bottom surface of the key cap.

8. The balance bar connecting structure for the key as claimed in claim 2, characterized in that the sleeve portion is provided with an action space connected from the pivot portion into the sleeve portion, and the two linkage sections of the balance bar member pass through the action spaces of the two satellite shaft modules, respectively, so that the two sliding sections and the two satellite shaft members are cooperatively connected.

9. The balance bar connecting structure for the key as claimed in claim 2, characterized in that the sliding groove is in an open state on a side corresponding to the pivot portion, and the sliding groove is formed to extend in a direction away from the pivot portion.

10. The balance bar connecting structure for the key as claimed in claim 2, characterized in that the sliding groove has a groove bottom away from the pivot portion, two opposite groove walls extending from the groove bottom toward the pivot portion, and a groove opening formed between the two opposite groove walls and adjacent to the pivot portion.

11. A satellite shaft module for a key, comprising:

a base body;

a linkage portion; and an engaging portion arranged on the linkage portion and extending upward;

wherein the linkage portion is provided with a sliding groove, and the sliding groove is in an open state on at least one side on the linkage portion, and is formed to extend in a direction away from the at least one side in the open state to receive a sliding section of a balance bar member; wherein the base body is configured to receive a linkage section of the balance bar member, wherein the linkage section extends through a center of the base body of the satellite shaft module and is at least partially contained within the base body.

12. The satellite shaft module for the key as claimed in claim 11, characterized in that the sliding groove has a groove bottom, two opposite groove walls extending from the groove bottom, and a groove opening formed between the two opposite groove walls to form the open state.

* * * * *